Inventor
RAYMOND E. ZENNER.

by [signature] Attys.

Inventor
RAYMOND E. ZENNER.

by [signature] Attys

Fig. 6.
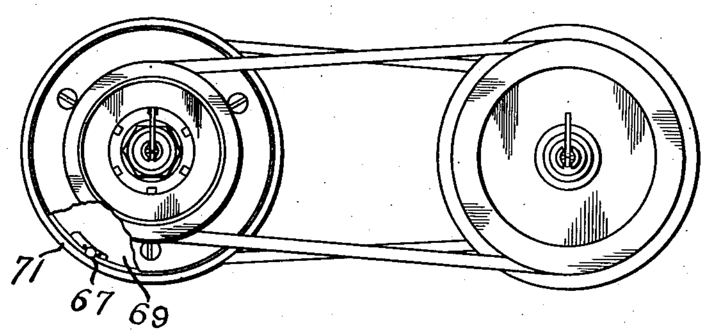
Fig. 7. Fig. 8.
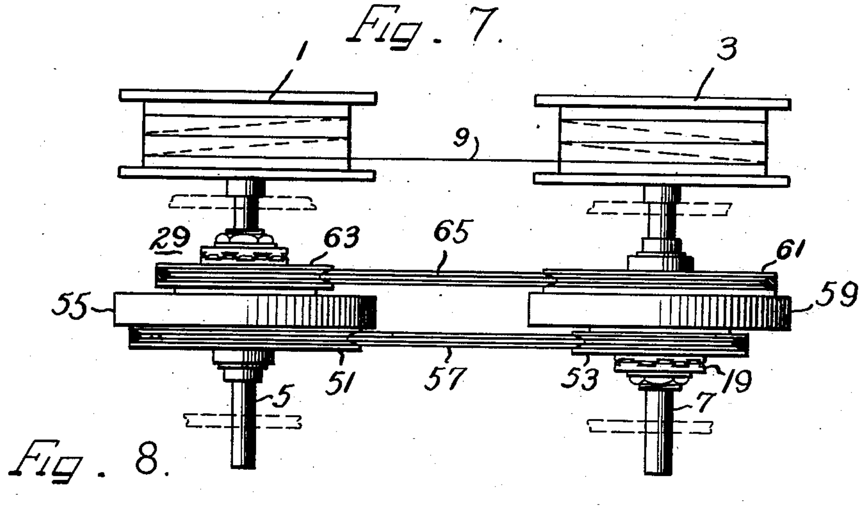
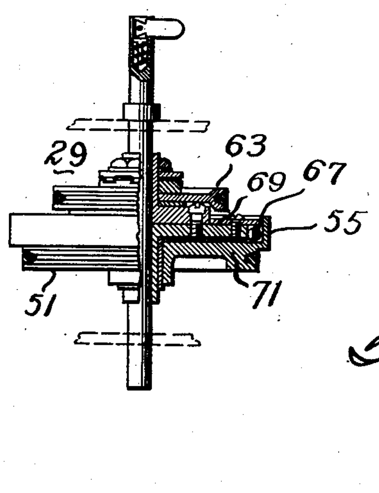
Inventor
RAYMOND E. ZENNER.
by [signature]
Attys Patented Aug. 19, 1952 2,607,544

UNITED STATES PATENT OFFICE 2,607,544

WINDING AND REELING MECHANISM

Raymond E. Zenner, Brookfield, Ill., assignor to Armour Research Foundation of Illinois Institute of Technology, Chicago, Ill., a corporation of Illinois Application August 16, 1946, Serial No. 690,956

7 Claims. (Cl. 242—54)

Figure 1:
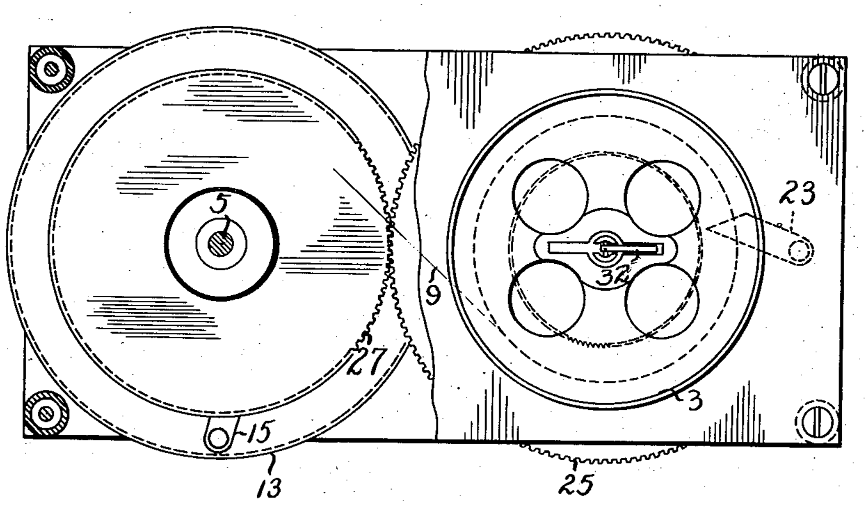

My invention relates to winding and reeling mechanisms of the type wherein a medium is transferred from one spool or pulley to another.

In apparatus where wire, tape, string, or other flexible medium is to be handled, it is frequently necessary to transfer this medium from one medium supporting device such as a spool or pulley to another in a controllable manner. Thus, in magnetic recording the magnetization of a wire or tape is varied along its length in accord with the music, voice, or other intelligence to be recorded by passing the medium at constant velocity over a device having a magnetic field varying with time in accord with the intelligence. In the reproducing operation, the process is similar, the wire or tape being passed over the pick-up device at constant velocity and the resultant time-varying induced voltages amplified to reproduce the intelligence represented by the longitudinal variations of magnetization of the wire or tape. In such mechanisms it is desirable to rotate the two storage spools at carefully regulated relative velocities, thereby maintaining the medium to be transferred in a taut condition to prevent slack while at the same time avoiding any possibility of breakage. It is further desirable to control the linear velocity of the medium transferred independently of the means provided to maintain the medium taut so that desired constancy in this linear velocity may be achieved by equipment provided for the purpose. Furthermore, in the case of the magnetic recorder it is highly desirable that the winding and reeling system permit different linear velocities with transfer of the medium in the two opposite directions so that the wire or tape may rapidly be rewound after recording or reproduction.

It is an object of my invention to provide an improved winding and reeling device that maintains the medium to be wound in taut condition during winding operations.

A further object of my invention is to provide an improved winding and reeling system capable of maintaining the medium to be wound in a taut condition regardless of the direction of winding.

Another object of my invention is to provide an improved winding and reeling system capable of winding the medium to be wound in both directions and suitable for operation with different velocities in each direction.

Still another object of my invention is to provide a winding and reeling system capable of operation from a single operating shaft and wherein rotation of that shaft in one direction winds the medium in one direction and reverse rotation of that shaft winds the medium in the opposite direction.

Still another object of my invention is to provide a winding and reeling system that is simple in construction and reliable in operation and is suitable for use in connection with magnetic recorders.

Yet another object of my invention is to provide a winding and reeling system capable of maintaining the medium in a taut condition regardless of the mode of imparting linear velocity thereto.

Further it is an object of my invention to provide an improved winding and reeling mechanism wherein the linear velocity of the medium transferred may be varied in accordance with any desired changes or maintained at any degree of constancy by independent means provided for the purpose and without causing loss of tautness or tangling.

Figure 9:
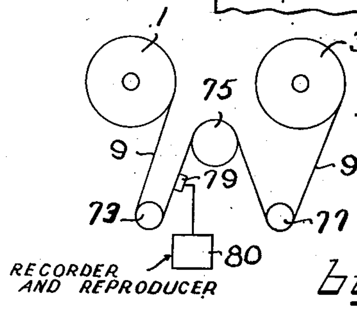

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Figures 1 and 2 are top and side views, respectively, of an illustrative embodiment of my invention, Figures 3, 4, and 5 show more detailed views of portions of this embodiment of my invention, Figures 6, 7, and 8 show the construction of an alternative embodiment thereof, and Figure 9 shows one form of drive mechanism that may be used therewith.

Figure 2:
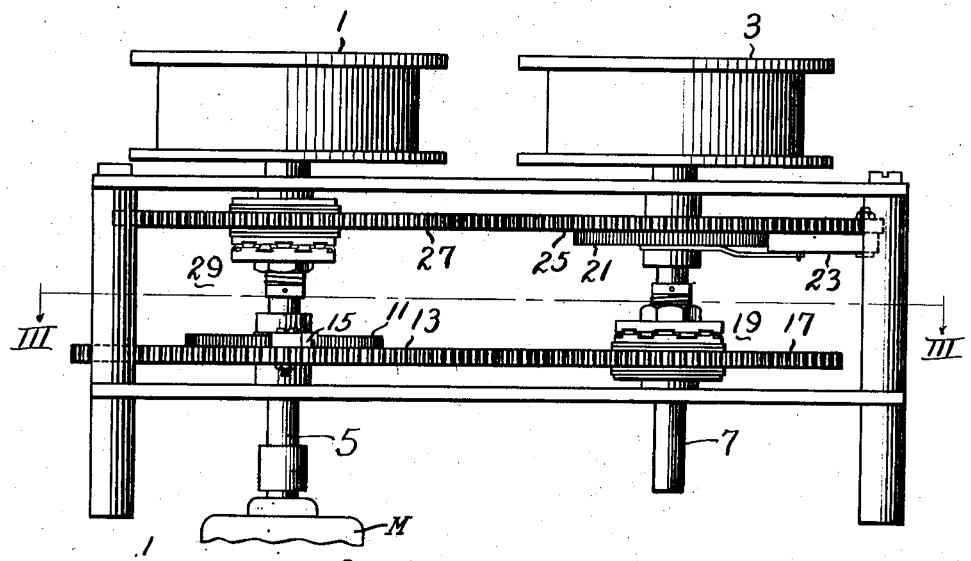

Referring now to Figures 1 and 2 which show top views and side views, respectively, of an embodiment of this invention, 1 and 3 represent spools upon which the medium, such as wire, string, tape, etc. to be transferred is stored. These spools are keyed to shafts 5 and 7 respectively so that rotation of either shaft causes rotation of the corresponding spool. For purposes of illustration, the shaft 5 is shown as being driven by a motor M. The medium to be wound is shown at 9, this medium being wound on the spools in such direction that when they are rotated in opposite directions (i. e. spool 1 clockwise and spool 3 counterclockwise as seen in Figure 1) the medium 9 is unwound from one spool and wound upon the other. Ratchet wheel 11 is keyed or otherwise mounted to rotate with shaft 5 so as to move in accordance with the movement of the spool 1. Gear 13 is rotatably mounted on shaft 5 but has pawl 15 adapted to coact with ratchet wheel 11 mounted on its surface. Gear 17 is rotatably mounted on shaft 7 and adapted to engage gear 13. A clutch shown generally at 19 connects gear 17 to shaft 7.

Figure 3:
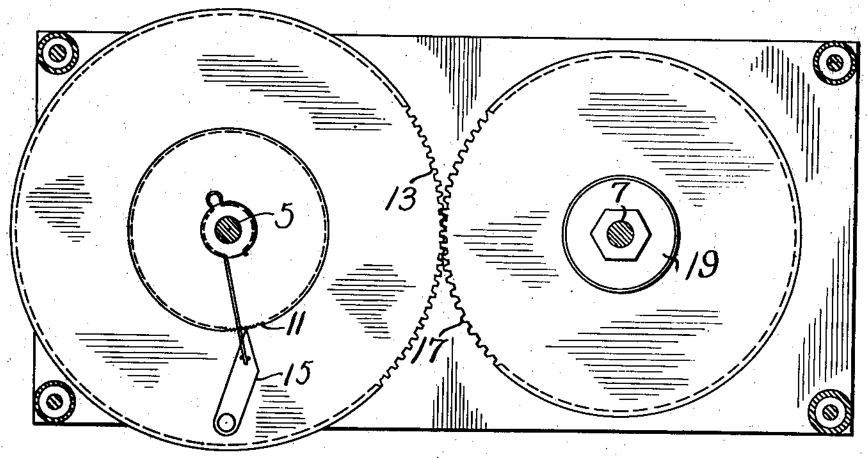
Figures 4, 5:
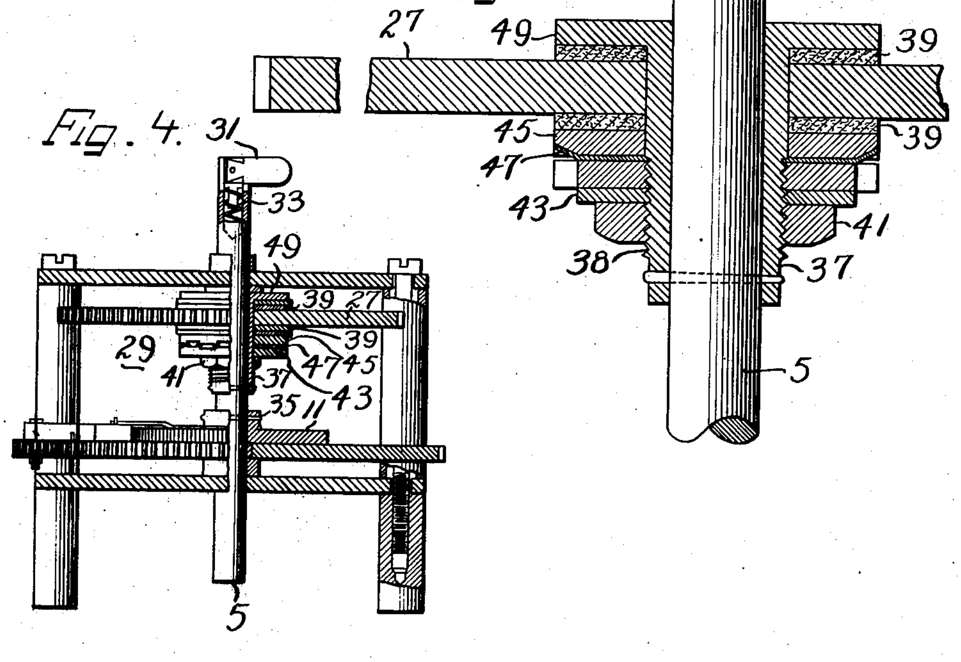

A plan view showing the arrangement of gears 13 and 17, together with pawl 15 and shafts 5 and 7 is shown in Figure 3, this view being taken through section III—III, Figure 2.

The operation of my reeling mechanism in one direction may now be described by considering the connection described above. If, for example, the spools are initially at rest and shaft 5 is rotated in the clockwise direction as seen from Figure 1, pawl 15 engages ratchet 11, thereby causing gear 13 to rotate in accordance with the rotation of shaft 5. This causes gear 17 likewise to rotate and thereby drives shaft 7 through friction clutch 19. The direct clockwise motion of shaft 5 correspondingly rotates spool 1, thereby causing that spool to unwind whereas motion of shaft 7 in the opposite direction (counterclockwise as seen in Figure 1) due to gears 13 and 17 causes spool 3 to wind. Thus, when spool 1 is rotated in the clockwise direction as seen from Figure 1, the medium 9 is wound from spool 1 to spool 3.

The ratio of gears 13 and 17 is chosen in proportion to the relative diameters of spools 1 and 3 to cause spool 3 to take-up wire at a more rapid rate than spool 1 releases wire when shaft 5 is rotated as above described. Thus, for example, if one turn of spool 1 releases three inches of wire, the gears are so chosen that the corresponding rotation of spool 3 would take-up some greater length of wire, as for example four inches. Since spool 3 attempts to take-up more wire than spool 1 releases, the wire is placed in a taut condition. However, the tensile stress on the wire is limited by the slipping action of clutch 19 which permits relative rotation of gear 17 without exerting excessive torque therebetween.

If spool 1 is rotated in the counterclockwise direction as viewed from Figure 1, spool 1 tends to wind and spool 3 tends to unwind. However, ratchet 11 tends to rotate in the counterclockwise direction with respect to gear 13 (see Figure 3) and in this condition pawl 15 slips over the ratchet 11 and no driving engagement exists between shafts 5 and 7 through gears 13 and 17. Thus it will be seen that the mechanism comprising ratchet 11, gears 13 and 17, pawl 15, and clutch 19 permits spool 1 to be unwound by rotation of shaft 5 in the clockwise direction in a manner maintaining the wire in a taut condition but causes no cooperative engagement between shafts 5 and 7 when shaft 5 is rotated in the counterclockwise direction.

It is the purpose of ratchet wheel 21, pawl 23, gear 25, gear 27, and the clutch shown generally at 29 to cause wire 9 to be wound from spool 3 to spool 1 when shaft 7 is rotated in the clockwise direction as seen in Figure 1. To this end, ratchet 21 is fixedly mounted upon shaft 7 so as to rotate with that shaft. Pawl 23 is mounted on gear 25 so as to cause rotation of that gear when ratchet wheel 21 tends to rotate in the clockwise direction relative to gear 25 and not otherwise, gear 25 being rotatably mounted on shaft 7. Gear 27 is rotatably mounted on shaft 5 and adapted to coact with gear 25. The clutch shown generally at 29 is mounted on shaft 5 so as to connect gear 27 thereto, thereby tending to cause shaft 5 to move in accordance with the motion of gear 27 but permitting relative motion therebetween.

The ratio of gears 25 and 27 is so chosen relative to the diameters of spools 1 and 3 that when shaft 7 is rotated in the clockwise direction the rate spool 3 releases medium 9 is less than the rate at which gear 27 rotates spool 1 to take-up that medium. Thus clutch 29 slips and maintains wire 9 in a taut condition.

In the event shaft 5 is rotated in the counterclockwise direction as seen in Figure 1, spool 1 winds in medium 9 and thus tends to rotate spool 3 in the clockwise direction by tension of that medium. Simultaneously, gear 25 is rotated by the mechanism comprising clutch 29, and gear 27, this rotation being in the clockwise direction. However, since the relative sizes of gears 25 and 27 are chosen to cause spool 1, when driven through these gears, to tend to take in more of medium 9 than is released by spool 3, the rotation of gear 25 incident to the above action tends to be at a smaller angular velocity in the clockwise direction than the rotation of spool 3 due to the pulling action of medium 9. Consequently ratchet wheel 21 tends to rotate in the clockwise direction relative to gear 25 and pawl 23 engages to cause these units to move at a common angular velocity. Thus clutch 29 slips and produces torque tending to restrain release of medium 9 by spool 3. Thus by clockwise rotation of shaft 5, medium 9 is passed from spool 1 to spool 3 by means of gears 13 and 17 and a taut condition maintained by the slippage of clutch 19 and by counterclockwise rotation of shaft 5 medium 9 is passed from spool 3 to spool 1 by direct pulling through the medium and a taut condition maintained by the retarding action due to gears 25 and 27 and the slippage of clutch 29. In a similar manner, clockwise rotation of shaft 7 causes medium 9 to be wound on spool 1 and counterclockwise rotation of shaft 7 causes medium 9 to be wound on spool 3.

The details of construction of clutches 19 and 29, together with further details of the other features of the apparatus of Figures 1, 2, and 3, may best be understood with reference to Figures 4 and 5 which show a part section taken through shaft 5 and an enlarged view of gear 27 and clutch 29 respectively. Key 31 coacts with spring 33 to cause rotation of spool 1 in accordance with rotation of shaft 5. The appearance of this key in the operating condition may be understood by reference to Figure 1 which shows a similar key 32 engaging spool 3 on shaft 7. The key is moved in the upward direction to permit removal of the spool. Ratchet wheel 11 is likewise keyed to shaft 5 by key 35 as is member 37 of clutch 29. As best seen in Figure 5, gear 27 is adapted frictionally to engage members 39 of clutch 29, these members being placed on opposite sides of gear 27. Pressure is applied to these members by means of nut 41 which is in threaded engagement with the threaded portions 38 of member 37 and which operates through collars 43 and 45, together with spring 47 and collar 49. The frictional engagement between gear 27 and shaft 5 is varied by adjustment of nut 41 which alters the axial force between member 39 and gear 27, thereby varying the frictional resistance to rotation therebetween.

One of the features of this invention resides in the various methods of driving the winding and reeling mechanism. Thus, for example, a reversible motor may be attached to shaft 5 and spool 1 unwound by clockwise rotation of this motor and wound by counterclockwise rotation thereof. In the case of clockwise rotation, shaft 7 tends to be driven through clutch 19 at a greater velocity than the rotational velocity corresponding to release of medium 9 by spool 1, thereby maintaining the medium in taut condition between the two spools. In the case of counterclockwise rotation, rotation of shaft 7 is frictionally restrained by means of clutch 29 coacting with gears 25 and 27, thereby tending to release wire at a smaller rate than it is taken-up by spool 1 and thus causing the wire to be maintained taut. Alternatively, shaft 7 may be driven by a reversible motor, clockwise rotation of the shaft causing spool 3 to unwind and spool 1 to wind and counterclockwise rotation causing spool 3 to wind and spool 1 to unwind.

A further feature of this invention resides in the fact that when the reeling mechanism is stopped there is no tendency for the unwind spool to continue rotation after the winding spool stops and thus cause excessive slack and possible tangling of medium 9. When the driving motor is attached to the unwind spool, stopping the motor prevents such rotation. When the other shaft is driven, or the unwind spool is driven by pulling the medium 9 therefrom, the interconnection of the shafts 5 and 7 causes the wind spool to continue rotation so long as the unwind spool rotates, thereby taking-up any of the recording medium thereby released.

Figures 6, 7 and 8 show an alternative construction of this invention utilizing a belt drive and ball-type overrunning clutches. In this construction pulleys 51 and 53 are mounted on shafts 5 and 7 in place of gears 13 and 17, respectively, and ball-type overrunning clutch 55 connected between pulley 51 and shaft 5 so as to cause shaft 5 to drive pulley 51 when rotated in the counterclockwise direction with respect thereto. Belt 57 is mounted on pulleys 51 and 53 so that rotation of pulley 51 causes corresponding rotation of pulley 53 and rotation of shaft 7 through clutch 19. Pulley 51 is made of larger diameter than pulley 53 to cause the overrunning action necessary to maintain medium 9 in a taut condition. Ball-type overrunning clutch 59 is mounted on shaft 7 and engages pulley 61 to cause rotation thereof when shaft 7 is moved in a clockwise direction relative to pulley 61. Pulley 63 is mounted on shaft 3 and engages clutch 29 to cause yieldable rotation of shaft 5. Belt 65 is connected between pulley 61 and pulley 63. Pulley 61 is made of larger diameter than pulley 63 in order to cause spool 1 to take-up more of medium 9 than is unwound by spool 3, thereby maintaining medium 9 in a taut condition.

The ball-type overrunning clutches 55 and 59, Figures 6, 7 and 8 are of conventional construction and include balls 67 (Figures 6 and 8) mounted between members 69 and 71. When members 69 and 71 are rotated in one direction relative to each other the balls swing free in the wider portion of the openings provided in member 69. However, opposite rotation of member 61 and 69 causes the balls to wedge between these members and thus to cause frictional engagement therebetween. Hence the clutch operates in a manner similar to a ratchet wheel and causes engagement in one direction only.

Operation of the embodiment of my invention shown in Figures 6, 7 and 8 is similar to the operation above described with respect to the embodiment of Figures 1 to 5. When shaft 5 is rotated in a counterclockwise direction, spool 3 tends to be driven through pulleys 51 and 53 and clutch 19 at a rate exceeding that corresponding to the rate of unwinding from spool 1 so as to maintain medium 9 in a taut condition. Conversely, when shaft 5 is rotated in the clockwise direction, release of medium 9 from spool 3 is opposed by the engagement through clutch 59 and pulleys 61 and 63, thereby maintaining medium 9 in a taut condition. Rotation of shaft 7 or pulling of the medium 9 from spool 1 produces similar action as above described with reference to the embodiment of this invention shown in Figures 1 to 5.

The use of belts as shown in Figures 6 to 8 permits shafts 5 and 7 to be mounted a relatively great distance apart, a feature that is desirable in some applications of this invention. However, since no reversal of rotation of shafts 5 and 7 accompanies the operation of the belt drive, the medium 9 is wound in opposite directions on spools 1 and 3 as shown in Figure 7.

One method of applying the winding and reeling device of Figures 1 and 2 to a magnetic recorder, together with an alternate method of imparting motion to the medium, is shown in Figure 9. As illustrated, medium 9 passes from spool 1 over pulley 73, through recording or reproducing head 79, about capstan 75, and over pulley 77 to spool 3. Capstan 75 is constructed frictionally to engage medium 9 so that rotational motion of the capstan due to a motor or other device (not shown) imparts corresponding linear velocity to the medium 9. If this velocity is in direction to unwind spool 1, that spool rotates in the clockwise direction as seen in Figure 1. Ratchet wheel 11 is thus rotated in the clockwise direction relative to gear 13 and pawl 15 and accordingly engages to tend to drive spool 3 through gears 13 and 17 and clutch 19 at a rate to take in more of medium 9 than is released by spool 1. Clutch 19 accordingly slips and maintains the medium 9 taut. If the velocity imparted to medium 9 by capstan 75 is in direction to unwind spool 3, a similar effect takes place as spool 1 is driven in the wind direction through clutch 29 and medium 9 maintained taut by slippage of that device.

Figure 9 also shows the manner of applying my invention to a magnetic recording or reproducing device. As shown in the figure, medium 9 passes through recording or reproducing head 79 which is electrically connected to recorder or reproducer 80. Thus, in the recording operation, device 80 (which may, for example, include a microphone and amplifier) causes variations in the intensity of the current flow through head 79 and thereby varies with time the magnetization imparted to medium 9. As capstan 75 causes the medium 9 to pass through head 79 with controlled linear velocity, corresponding longitudinal variations in the magnetization of medium 9 are produced. In the reproducing operation, motion of medium 9 imparted by capstan 75 causes time varying induced voltages in head 79 which are amplified and reproduced by recorder and reproducer 80 (which may in this case be connected to amplify the voltages and apply the resultant signals to a loud speaker or similar device to reproduce sound).

It will be apparent to those skilled in the art that while I have described my invention with respect to a single drive system operating on shafts 5 or 7 or independently imparting linear velocity to medium 9, separate drives operating on these different elements may be used if desired. Thus, shaft 5 may be driven in one direction and one velocity to accomplish winding from spool 1 to spool 3 and shaft 7 may be driven in the same direction at another velocity to accomplish the reverse process. In this fashion the rewind operation can be made to take place at a different rate without requiring complex reversible two-speed driving systems.

In one method of visualizing the operation of my invention, the interconnections between the spools may be considered to tend to drive the spools in the take-up direction relative to each other irrespective of direction or velocity of motion. Thus no matter how fast one spool releases the medium, the other spool is attempting to wind it in at a greater rate. Consequently the medium is maintained taut regardless of direction or velocity of motion or the source of energy imparting the motion to the medium. I am thereby enabled to provide a winding and reeling mechanism having an unusual degree of flexibility and a correspondingly large number of practical applications.

In the accompanying claims I have used the term "spool" to designate broadly a reel, guide wheel, or other device capable of supporting the medium.

While I have shown particular embodiments of my invention, it will be of course understood that I do not wish to be limited thereto since many modifications in the elements disclosed and their cooperative arrangement may be made without departing from the spirit and scope thereof. I therefore contemplate by the appended claims to cover all such modifications as fall within the true spirit and scope of my invention.

I claim as my invention:

1. In a winding and reeling mechanism, a first spool, a second spool, a drive shaft connected to each of said spools, a pair of one-way drive means, each of said one-way drive means being engageable with one of said shafts, means for driving one of said drive shafts, and a plurality of speed-amplifying, torque-transmitting means interconnecting said shafts, one of said speed-amplifying means being operable upon engagement of one of said one-way drive means, whereby rotation of one of said shafts in a given direction causes rotation of the other of said shafts through said speed-amplifying means and thereby tends to rotate said other shaft at a higher angular velocity than the first named shaft.

2. In a winding and reeling mechanism, a first spool, a second spool, a drive shaft connected to each of said spools, a pair of one-way drive means one of said one-way drive means being engageable with one of said shafts, means for driving one of said drive shafts, and a pair of speed-amplifying, torque-transmitting means interconnecting said shafts, one of said speed-amplifying means being operable upon engagement upon one of said one-way drive means, and a slipping friction clutch on each of said shafts, whereby rotation of one of said shafts in a given direction causes rotation of the other drive shaft through said speed-amplifying means and thereby tends to rotate said other shaft at a higher angular velocity than the first named shaft.

3. In a winding and reeling mechanism, a first spool, a second spool, a drive shaft connected to each of said spools, a pawl and ratchet assembly engageable with each of said shafts, means for driving one of said drive shafts, and a pair of speed-amplifying, torque-transmitting means interconnecting said shafts, one of said speed-amplifying means being operable upon engagement of one of said pawl and ratchet assemblies, whereby rotation of one of said shafts in a given direction causes rotation of the other drive shaft through said speed-amplifying means and thereby tends to rotate said other shaft at a higher angular velocity than the first named shaft.

4. In a winding and reeling mechanism, a first spool, a second spool, a drive shaft connected to each of said spools, a pair of pawl and ratchet assemblies, one of said pawl and ratchet assemblies being engageable with one of said shafts, means for driving one of said drive shafts, a pair of speed-amplifying, torque-transmitting means interconnecting said shafts, one of said speed-amplifying means being operable upon engagement of one of said pawl and ratchet assemblies, and a slipping friction clutch on each of said shafts, whereby rotation of one of said shafts in a given direction causes rotation of the other drive shaft through said speed-amplifying means and thereby tends to rotate said other shaft at a higher angular velocity than the first named shaft.

5. In a winding and reeling mechanism, a first spool, a second spool, a drive shaft connected to each of said spools, a pawl and ratchet assembly engageable with each of said shafts, a pair of step-up gear trains interconnecting said shafts, one of said gear trains being operable upon engagement of one of said pawl and ratchet assemblies, whereby rotation of one of said shafts in a given direction causes rotation of the other drive shaft through said step-up gear train and thereby tends to rotate said other shaft at a higher angular velocity than the first named shaft.

6. In a winding and reeling mechanism, a first spool, a second spool, a drive shaft connected to each of said spools, a pawl and ratchet assembly engageable with each of said shafts, a pair of step-up gear trains interconnecting said shafts, one of said gear trains being operable upon engagement of one of said pawl and ratchet assemblies, and a slipping friction clutch on each of said shafts, whereby rotation of one of said shafts in a given direction causes rotation of the other drive shaft through said gear train and thereby tends to rotate said other shaft at a higher angular velocity than the first named shaft.

7. In a winding and reeling mechanism, a first spool, a second spool, a drive shaft connected to each of said spools, a pair of one-way drive means engageable with each of said shafts, means for driving one of said drive shafts, and a pair of pulley wheels of different diameters on each of said shafts, a pair of belts interconnecting the larger diameter pulley wheel on one shaft with the smaller diameter pulley wheel on the other shaft, one pair of interconnected pulley wheels being operable upon engagement of said one-way drive means to drive one shaft from the other, whereby rotation of one of said shafts in a given direction causes rotation of the other drive shaft through said interconnected pulleys, and thereby tends to rotate said other shaft at a higher angular velocity than the first named shaft.

RAYMOND E. ZENNER.

REFERENCES CITED

The following references are of record in the file of this patent:

10

UNITED STATES PATENTS

| Number | Name | Date |
|---|---|---|
| 1,874,184 | Goldberg | Aug. 30, 1932 |
| 2,078,357 | Woodmansee et al. | Apr. 27, 1937 |
| 2,080,812 | Fairbanks | May 18, 1937 |
| 2,418,543 | Camras | Apr. 8, 1947 |
| 2,457,699 | Marsen | Dec. 28, 1948 |

FOREIGN PATENTS

| Number | Country | Date |
|---|---|---|
| 70,843 | Austria | Jan. 10, 1916 |
| 139,202 | Germany | May 15, 1934 |
| 313,672 | Great Britain | June 20, 1929 |
| 408,658 | Germany | Jan. 24, 1925 |
| 641,843 | Germany | Feb. 15, 1947 |